H. A. HILLS.
FILTER.
APPLICATION FILED JULY 28, 1916.
1,352,961. Patented Sept. 14, 1920.
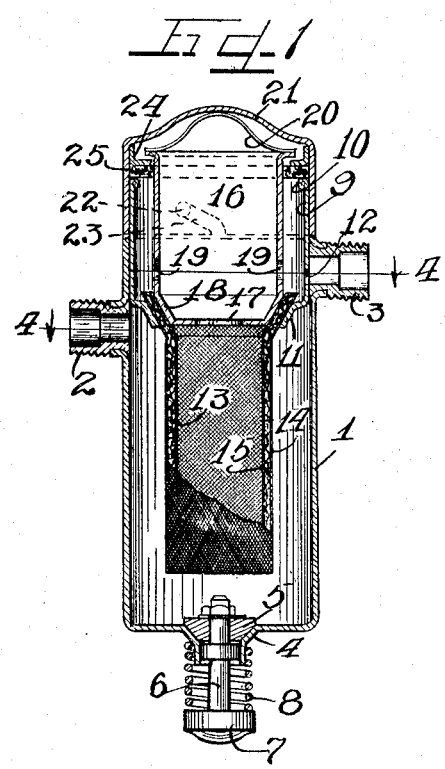
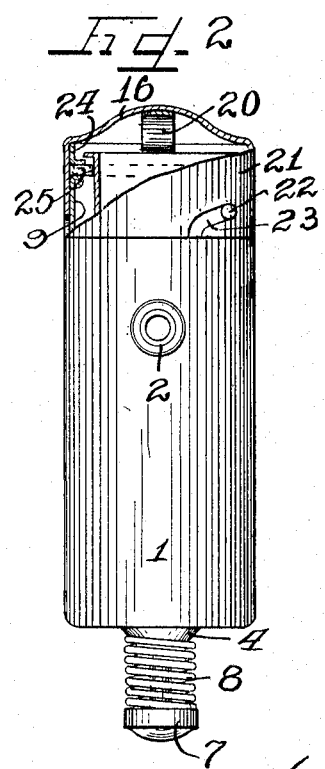
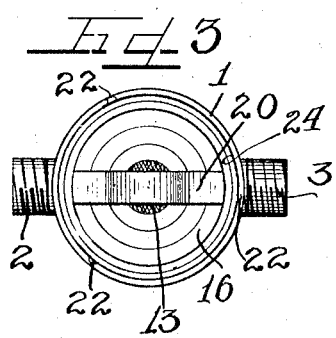
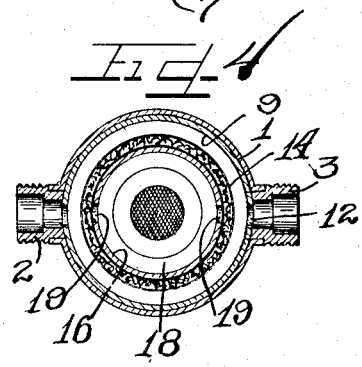
Witnesses
Inventor
Henry A. Hills

UNITED STATES PATENT OFFICE.

HENRY A. HILLS, OF GRAND RAPIDS, MICHIGAN.

FILTER.

1,352,961. Specification of Letters Patent. Patented Sept. 14, 1920.

Application filed July 28, 1916. Serial No. 111,906.

*To all whom it may concern:*

Be it known that I, HENRY A. HILLS, a citizen of the United States, and a resident of the city of Grand Rapids, in the county of Kent and State of Michigan, have invented certain new and useful Improvements in Filters; and I do hereby declare that the following is a full, clear, and exact description of the same, reference being had to the accompanying drawings and to the numerals of reference marked thereon, which form a part of this specification.

This invention relates to a small compact filter particularly adapted for use on motor cars to be connected into the fuel line between the supply tank and the carbureter of the engine to prevent introduction of water or other impurities mixed with the fuel into the carbureter.

This invention relates to an improved type of filter and separator construction from which the parts are instantly removable without disconnection of the filter from the fuel line and without requiring tools for the purpose, and further provided with a drain valve of simple construction requiring only pressure thereagainst for an instant to drain and flush the filter.

It is also an object of this invention to construct a filter provided with a filtering element of relatively large area which is instantly removable from the filter by merely detaching the cap thereof, and without requiring disconnection of the filter itself from the supply line.

It is also an object of this invention to construct a filter built up of stamped metal parts, and with the filtering element removable as a unit through the upper end of the filter without requiring disconnection of the filter from the fluid line, and with a normally closed spring controlled drain valve provided in the lower end of the filter adapted to be opened by pressure to flush the interior of the filter, and closing automatically when the pressure is released therefrom.

It is furthermore an important object of this invention to construct a filter built up of stamped metal parts and provided with an easily removable filtering element comprising inner and outer screens with a fabric bag, impervious to water but pervious to the liquid or oil to be filtered, disposed therebetween, and with the filtering element normally disposed within the filter in the path of fluid entering the inlet of the filter to utilize the entering fluid as a washing or flushing means for the filtering element when the drain valve at the bottom of the filter is opened.

It is finally an object of this invention to construct an improved type of filter and separator simple in construction and operation and adapted to be readily cleaned and taken apart without requiring disconnection thereof from the fluid line.

The invention (in a preferred form) is illustrated in the drawings and hereinafter more fully described.

In the drawings:

Figure 1 is a central vertical section taken through a filter embodying the principles of my invention with parts shown in elevation.

Fig. 2 is an exterior view thereof with the upper portion broken away to show the construction.

Fig. 3 is a top plan view of the device with the cover cap removed.

Fig. 4 is a section taken on line 4—4 of Fig. 1.

As shown in the drawings:

The device consists of a stamped metal cylinder 1, having secured in one side wall thereof a threaded inlet 2, and on the opposite side thereof and slightly thereabove a threaded outlet 3, and at its lower end said cylinder is struck downwardly to afford a conical seat 4, for an outlet drain valve comprising a closure 5, mounted on a stem 6. An enlarged head is formed or secured upon the lower end of the stem 6, as denoted by the reference numeral 7, and seated thereon is one end of a coiled compression spring 8, the other end of which bears upwardly against the down-struck portion 4, of the cylindrical casing, said spring acting normally to maintain said valve closure 5, in closed position on its seat.

Fitted tightly into the upper open end of the cylindrical casing 1, is a short cylindrical member 9, the upper edge of which is beaded, as denoted by the reference numeral 10, and the lower margin of which is struck inwardly to afford a conical flange 11. An outlet aperture 12, is provided through the wall of said cylindrical member 9, in register with the outlet 3, of the device. Disposed centrally within the cylinder 1, is a cylindrical filtering element comprising an inner screen 13, and outer screen 14, and a fabric bag 15, disposed therebetween, and the upper end of each of said screens is flanged conically outward, as clearly shown in Fig. 1, to seat upon the conical flange 11. For the purpose of positively retaining the filtering element upon the supporting flange 11, an inner cup 16, is provided, having an aperture 17, in the lower end thereof, and the side walls of said cup 16, at its lower end, are angled or beveled inwardly, as denoted by the reference numeral 18, to seat within the upper conical margin of the filtering element. Said cup 16, is provided with outlet apertures 19, in the side walls thereof, and is held in position by a leaf spring 20, secured on its upper end, said leaf spring being normally thrust downwardly by a stamped metal outer cap 21, which fits around the cylindrical member 9. For the purpose of retaining said cap 21, in position on the device, three outwardly stamped detents 22, are provided on the cylindrical member 9, and the cap 21, is provided with three helical slots 23, one of which is shown in Fig. 2, adapted to engage with said detents as the cap is thrust downwardly and rotated a slight amount into position on the device.

In order to afford a seal for said cap 21, a flanged ring or washer 24, is provided, and if desired may be brazed or otherwise rigidly secured on the interior thereof, and compressed between said flanged ring 24, and the upper beaded margin 10, of the inner cylinder 9, is a packing ring 25, of cork or any other suitable material.

The fabric bag or separating element 15, may be of any suitable close woven or constructed felt or fabric, treated chemically in any suitable manner to render the same unpenetrable to water or the liquid to be separated out but pervious to the more penetrable liquid or oil to be required, for example, gasolene. For this purpose any preferred water proofing treatment of the fabric may be employed.

The operation is as follows:

The fluid to be filtered is admitted into the device through the inlet 2, and surrounds the filtering element composed of the screens 13 or 14, and water proofed fabric, and the water cannot pass therethrough while the penetrating liquid passes freely therethrough and upwardly in the device and out through the outlet 3, leaving the water and dirt behind in the chamber or receptacle formed by the casing. For ordinary purposes, in order to clean the filtering element of the device, it is only necessary to thrust upwardly on the enlarged head 7, of the valve at the bottom of the device, thereby moving the valve closure 5, into an open position, and permitting water and dirt to drain from the device. Inasmuch as the inlet is disposed at the upper end of the chamber containing the filtering element, the entering fluid passing through said inlet may also be used, as well as the water separated therefrom, to wash and flush the filtering element of any impurities adhering thereto. If it is desired to repair, replace, or more thoroughly clean the filtering element, the cap 21 may be instantly removed by a slight rotational movement thereof, whereupon the inner cup 16, and then the associated screens and fabric comprising the filtering elements, are lifted out through the open end of the device. Due to the interposition of the spring 20, a sealing pressure of the flanged ring on the cap against said cork packing ring 25, is assured, for were it not for the spring 20, the pressure of the cap would be transmitted through the cup member and flange of the filtering element directly to the rigid cylindrical member 9. The construction of the filter permits the same to be easily and cheaply manufactured, and affords a device simple to assemble, practically all the parts being constructed of stamped metal. The outer screen 14, of the filtering element, serves to prevent lodgment of impurities in the fabric 15, and the inner screen 13, serves to prevent collapsing of the filter fabric or bag.

I am aware that various details of construction may be varied through a wide range without departing from the principles of this invention, and I therefore do not purpose limiting the patent granted otherwise than necessitated by the prior art.

I claim as my invention:

1. In a device of the class described a cylindrical casing, an inner supporting cylindrical element fitted frictionally into the upper end thereof, a filtering element supported on said element, an inner cup bearing upon the upper end of said filtering element to retain the same upon said supporting element, and a cap fitted around said supporting element, and fitting closely to the upper end of said cylindrical casing and acting to thrust said cup inwardly to positively retain the filtering element in position on said supporting member.

2. In a device of the class described the combination with a cylindrical casing, of a supporting cylindrical member fitted tightly in the upper end thereof, a filtering element resting on said supporting member and extending into said cylindrical casing, a retaining cup within said cylindrical member bearing upon the upper end of said filtering element to retain the same on said member, a cap fitted around said supporting member to close the upper end of said cylindrical casing, and resilient means interposed between said cap and cup to hold said cup upon said filtering element to retain the same in position.

3. In a filter of the class described a cylindrical casing, an inlet and outlet thereon, a cylindrical filtering element disposed axially within said casing comprising inner and outer cylindrical screens, and a fabric bag interposed therebetween, a cylindrical member fitted within said casing to support said filtering element, a cup member within said cylindrical member spaced therefrom and bearing upon the upper end of said filtering element to retain the same in position on said supporting member, a cap fitted around said inner cylindrical supporting member and abutting the upper end of said casing between said cap and said cylindrical member, and resilient means interposed between said cap and said cup member to thrust said cup member tightly upon said filtering element to positively retain the same in position.

4. In a device of the class described a cylindrical casing, a cylindrical member fitting frictionally therein, a filtering element supported thereon, and a cup member bearing on said filtering element to retain the same in position on said supporting cylindrical member.

5. In a device of the class described a cylindrical casing, an inner cylindrical member fitted into the upper end thereof, a filter element supported on said inner cylindrical member, a cup member disposed within said cylindrical member and bearing on said filter element to hold the same attached on said inner cylindrical member, a packing ring laid around the upper end of said inner cylindrical member, a cap fitted over said cylindrical member and bearing on said packing ring, and resilient means interposed between said cap and said cup member to permit a direct pressure to be exerted by said cap on said packing ring.

6. In a filter of the class described a casing, a member fitted frictionally in the upper end thereof, a filter element depending therefrom, means bearing on said filter element to hold the same associated with said member, a packing ring laid on the upper end of said member, a cap fitted over said member and bearing on said packing ring, and resilient mechanism disposed between said cap and said means to hold said means in position and permit a direct compression of said cap on said packing ring.

7. In a device of the class described a cylindrical casing, an inner cylindrical member fitted into the upper end thereof, a water proofed filtering means pervious to the liquid to be filtered supported on said inner cylindrical member, a cup member bearing on said means to hold the same attached, a packing ring around the upper end of said inner cylindrical member, and a cap fitted over said cylindrical member and bearing on said packing ring.

8. In a device of the class described a cylindrical casing, an inner cylindrical member fitted into the upper end thereof, a water proofed filtering means pervious to the liquid to be filtered supported on said inner cylindrical member, a cup member bearing on said means to hold the same attached, a packing ring around the upper end of said inner cylindrical member, a cap bearing on said ring and resilient means interposed between said cap and said cup member whereby, direct pressure is exerted on said packing ring by said cap.

In testimony whereof I have hereunto subscribed my name in the presence of two subscribing witnesses:

HENRY A. HILLS.

Witnesses:
CARLES W. HILLS, Jr.,
EARL M. HARDINE.